3,074,971
α-CYANOCINNAMIC ACID ESTERS
Albert F. Strobel, Delmar, and Sigmund C. Catino, Castleton, N.Y., assignors to General Aniline & Film Corporation, New York, N.Y., a corporation of Delaware
No Drawing. Filed Jan. 23, 1959, Ser. No. 788,508
9 Claims. (Cl. 260—347.4)

This invention relates to new and useful α-cyano-p-hydroxycinnamic acid esters and amides and to processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint fim or a dyed textile.

It is therefore an object of the present invention to provide new and useful compounds characterized by outstanding ultra-violet absorbing properties.

It is a further object of this invention to provide new and useful α-cyano-p-hydroxycinnamic acid esters and amides.

It is a still further object of this invention to provide new and useful α-cyano-p-hydroxycinnamic acid esters and amides exhibiting outstanding ultra-violet properties.

It is another object of this invention to provide processes for the preparation of new and useful ultra-violet absorbing compounds.

It is still another object of this invention to provide processes for the preparation of new and useful α-cyano-p-hydroxycinnamic acid esters and amides.

Other objects and advantages will appear hereinafter as the description proceeds.

The new and useful compounds of this invention are characterized by the following general formula:

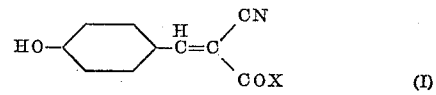
(I)

wherein X is $OR_1$ or $NR_2R_3$ and wherein $R_1$ is hydroxyalkyl such as hydroxyethyl, hydroxypropyl, etc.; haloalkyl such as chloroethyl, chloropropyl, etc.; cyanoalkyl such as cyanoethyl, cyanopropyl, etc.; alkoxyalkyl such as methoxyethyl, methoxypropyl, etc.; hydroxyalkoxyalkyl such as hydroxyethoxyethyl, etc.; carbalkoxyalkyl such as carbomethoxyethyl, carbethoxyethyl, etc.; aryl, substituted aryls, aralkyls, alkaryls, hetero and substituted aralkyls, alkaryls and hetero and $R_2$ and $R_3$ may be hydrogen, alkyl or any of the $R_1$ substituents. In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Among the types of compounds which are reactive in this manner are the following:

Alcohols
Amides
Monosubstituted amides
Amines
Sulfonamides to yield compounds of the following general type:

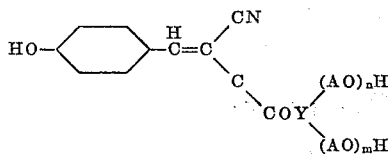

wherein Y represents the bridge to the reactive grouping derived from X of Formula I, e.g., —$CH_2O$— in the case of alcohols, —$SO_2N<$ in the case of sulfonamides, —$CON<$ in the case of amides and —$N<$ in the case of amines, A represents the hydrocarbon residue of the oxyalkylating agent, e.g., ethylene (from ethylene oxide), propylene (from propylene oxide and epichlorohydrin), etc., $n$ represents an integer up to 100, and $m$ represents zero and an integer up to 100, the total of $m$ and $n$ representing the moles of oxyalkylating agent, and being no greater than 100, (1)
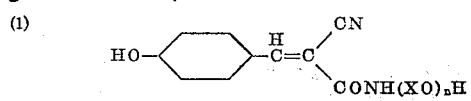

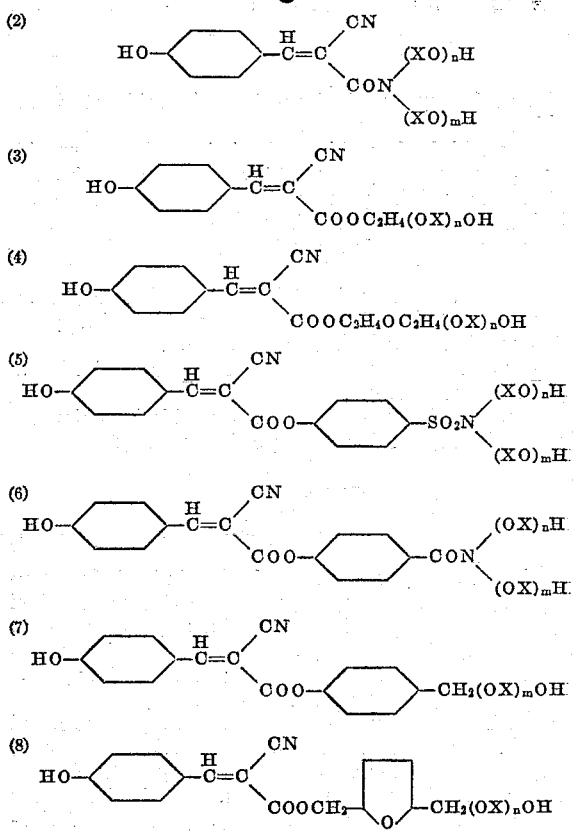

In preparing the polyoxyalkylated derivatives of the above types, it is necessary to prevent interaction of the phenolic hydroxyl group of the benzaldehyde moiety from entering into this reaction. This may be accomplished by esterifying the said hydroxyl group with benzene sulfonyl chloride and then regenerating it by hydrolysis after the cyanocinnamate has been prepared.

The following specific substituents for $R_1$ may be employed in the above generic formulation (I):

Cyanoethyl
Cyano-n-propyl
Cyanoisopropyl
Cyano-n-butyl
Cyanoisobutyl
Cyano-n-amyl
Cyanoisoamyl
Cyano-n-hexyl
Cyanoisohexyl
Cyanoheptyl
Cyanooctyl
Cyanodecyl
Cyanolauryl, and the like
Hydroxyethyl
Hydroxy-n-propyl
Hydroxyisopropyl
Hydroxy-n-butyl
Hydroxyisobutyl
Hydroxy-n-amyl
Hydroxyhexyl
Hydroxyheptyl
Hydroxy-n-octyl
Hydroxyisooctyl
Hydroxy-n-nonyl
Hydroxyisononyl
Hydroxydecyl
Hydroxylauryl
Hydroxystearyl
Chloroethyl
Chloropropyl (n-propyl, isopropyl)
Chlorobutyl (n-butyl, isobutyl, etc.)
Chloroamyl
Chlorohexyl
Chlorodecyl
Chlorolauryl, and the like.
Bromoethyl
Bromopropyl (n-propyl, isopropyl)
Bromobutyl (n-butyl, isobutyl, etc.)
Bromoamyl
Bromohexyl
Bromodecyl
Bromolauryl, and the like.
Methoxyethyl
Methoxypropyl (n-propyl, isopropyl)
Methoxybutyl (n-butyl, isobutyl, etc.)
Methoxyamyl
Methoxyhexyl
Methoxydecyl
Methoxylauryl, and the like.
Ethoxyethyl
Ethoxypropyl (n-propyl, isopropyl)
Ethoxybutyl (n-butyl, isobutyl, etc.)
Ethoxyamyl
Ethoxyhexyl
Ethoxydecyl
Ethoxylauryl, and the like.
Phenyl
Halophenyl (chlorophenyl, bromophenyl)
Alkoxy phenyl (methoxyphenyl, ethoxy phenyl)
Tolyl
Xylyl
Halotolyl
Haloxylyl
Alkoxy tolyl
Haloalkoxy tolyl, and the like
Tetrahydrofurfuryl, and the like The general process for the preparation of the compounds of Formula I involves the condensation of p-hydroxy benzaldehyde with the corresponding ester of cyanoacetic acid in the presence of a secondary base.

The basic condensation catalyst may be any secondary amino compound and preferably a secondary aliphatic amine such as piperidine. However, other bases which may be used include the following:

Diethylamine
Di-n-propylamine
Cyclohexylamine
Morpholine
Diethanolamine, and the like The usual procedure involves heating a mixture of the reactants in the presence of the basic catalyst at elevated temperatures until the reaction is substantially complete. A solvent may be employed to effect miscibility of the reactants and when such a solvent is used, the temperature of the reaction will usually be the reflux temperature of the solvent solution of the ingredients. In the absence of a solvent, temperatures from about 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture with a solvent which precipitates out the ester. Thus, methanol may be employed in many cases as such a diluent, and the resultant slurry is then filtered at low temperatures (0 to 5° C.) to separate the crystalline product.

The following examples will serve to illustrate the present invention without being deemed limitative thereof. Where parts are indicated, parts by weight are intended.

EXAMPLE 1

*Preparation of Cyanoethyl α-Cyano-p-Hydroxycinnamate*

Preparation of

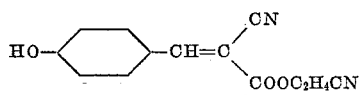

This product is prepared by the condensation of p-hydroxy benzaldehyde and cyanoethyl cyano acetate having the formula $NCCH_2COOCH_2CH_2CH_2CN$. The latter is prepared by combining 2 moles of cyanoacetic acid, 2.2 moles of cyanoethyl alcohol, 300 mls. of chloroform and 10 gr. of a mixed alkane sulfonic acid catalyst in a 1 liter flask with a water separator and condenser. The mixture is heated under reflux with steam until no more water separates. The reaction mixture is then treated with dilute sodium hydroxide solution and thereafter washed with water until neutral. The product is then extracted with choloroform, dried and solvent distilled.

The condensation between p-hydroxy benzaldehyde and cyanoethyl cyano acetate is carried out by heating 1 molecular equivalent of each of the reactants in the presence of 1 liter of alcohol as a solvent and 10 gr. of piperidine as a catalyst. The mixture is refluxed for 8 hrs. and thereafter evaporated to dryness. The crude product is slurried with dilute hydrochloric acid, filtered and dried. A substantially quantitative yield is obtained.

EXAMPLE 2

The compound of Example 1 is tested as an ultra-violet absorber by incorporating it into a polyester sheet in the following manner. To 100 gr. of Polyite 8000 there is added 0.25 gr. of the ultra-violet absorber of Example 1 and 1 gr. of a 50% solution of benzoyl peroxide in tricresyl phosphate. A clear casting of the polyester composition is made between glass plates treated on the mold side with Dri-Film SC–87 (G.E.). Tygon tubing is used as the gasket material between the glass plates which are clamped together to prevent leaking. The resin is cured by placing in an oven at 65° C., then raising the temperature slowly to 95° C., holding for 1 hr. at this temperature and then further raising the temperature to 120° C. and holding it there for ½ hr. to complete the curing cycle. A similar casting is prepared except that the ultra-violet absorber is omitted. A comparison of the light-fastness properties of the two sheets indicates a vast superiority of the sheet containing the ultra-violet absorber, and stabilizing the resin sheet towards light.

EXAMPLE 3

Preparation of:

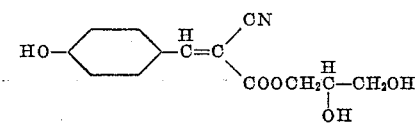

Preparation of

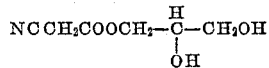

The intermediate glycerol cyano acetate is prepared as follows:

170 gr. of cyanoacetic acid
370 gr. of glycerol
25 gr. of toluene sulfonic acid, and
500 cc. of benzene are heated for 28 hrs. The ester is isolated by neutralizing the mixture with aqueous sodium bicarbonate, saturating the solution with sodium chloride, and extracting the ester with ethyl acetate. This solution is then dried over anhydrous sodium sulfate and distilled to give a light brown oil-like material. This intermediate glyceryl ester is then condensed with p-hydroxy benzaldehyde in the manner described in Example 1 to give the desired cinnamate ester.

EXAMPLE 4

The compound of Example 3 is employed as an ultra-violet absorber in cellulose acetate by the incorporation therein in the following manner. To a mixture consisting of 4.0 cc. of ethyl alcohol, 7.0 cc. of methyl Cellosolve, 10.0 cc. of ethyl acetate, and 25.0 gr. of cellulose acetate dope (3.75 gr. of cellulose acetate in 21.2 gr. acetone) there is added 0.375 gr. of the ultra-violet absorber of Example 3. A clear solution results, and a film is then formed by manually drawing out a wet film onto a glass plate with a Bird Film Applicator. The film is allowed to dry to give a 5 mil dry film. A similar film is prepared except that the ultra-violet absorber is omitted. Fresh meat wrapped in these films indicates that the film containing the ultra-violet absorber undergoes far less degradation than meat wrapped with the film free of the ultra-violet absorber. A similar test employing butter indicates the same protection rendered by the ultra-violet absorber containing film.

EXAMPLE 5

Preparation of

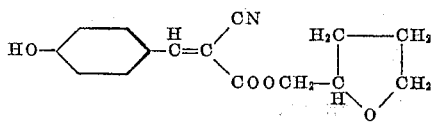

The intermediate tetrahydrofurfuryl cyano acetate is prepared in the following manner. 170 gr. (2.0 moles) cyanacetic acid is mixed with 222 gr. (2.2 moles) tetrahydrofurfuryl alcohol. 300 mls. chloroform, and 10 gr. mixed alkane sulfonic acid in a 1 liter flask equipped with condenser and water separator. The material is heated under reflux on a steam bath until no more water is taken off. The product is treated with sodium hydroxide solution, then washed until neutral to delta paper. The product is extracted with chloroform, dried, solvent removed and distilled at 140°–144° C. at 0.5 mm. Yield—58%.

The condensation of p-hydroxy benzaldehyde with this intermediate is carried out as in Example 1 using equimolecular amounts of the aldehyde and of the cyano acetate. This product is tested in a polyester resin as in Example 2. Similar outstanding results are obtained.

In Table I will be found additional compounds of outstanding ultra-violet absorbing characteristics which compounds are prepared similarly as that of Example 1 from the indicated cyano-acetate and wherein $R_1$ comes within the scope of the substituents given above.

TABLE I

| Example | Cyanoacetate | $R_1$ | Cinnamate |
|---|---|---|---|
| 6 | $CNCH_2COOCH_2CH_2OH$ | $-CH_2CH_2OH$ | $C^*\genfrac{}{}{0pt}{}{CN}{COOCH_2CH_2OH}$ |
| 7 | $CNCH_2COOCH_2CH_2CH_2OH$ | $-CH_2CH_2OH$ | $C^*\genfrac{}{}{0pt}{}{CN}{COOCH_2CH_2CH_2OH}$ |
| 8 | $CNCH_2COOCH_2CH_2Cl$ | $-CH_2CHCl$ | $C^*\genfrac{}{}{0pt}{}{CN}{COOCH_2CH_2Cl}$ |
| 9 | $CNCH_2COOCH_2CH_2CH_2Br$ | $-CH_2CH_2CH_2Br$ | $C^*\genfrac{}{}{0pt}{}{CN}{COOCH_2CH_2CH_2Br}$ |
| 10 | $CNCH_2COOCH_2CH_2OCH_3$ | $-CH_2CH_2OCH_3$ | $C^*\genfrac{}{}{0pt}{}{CN}{COOCH_2CH_2OCH_3}$ |
| 11 | $CNCH_2COOCH_2CH_2OCH_2CH_3$ | $-CH_2CH_2OCH_2CH_3$ | $C^*\genfrac{}{}{0pt}{}{CN}{COOCH_2CH_2OC_2H_5}$ |
| 12 | $CNCH_2COOCH_2CH_2OCH_2CH_2OH$ | $-CH_2CH_2OCH_2CH_2OH$ | $C^*\genfrac{}{}{0pt}{}{CN}{COOCH_2CH_2OCH_2CH_2OH}$ |
| 13 | $CNCH_2COOCH_2CH_2OCH_2CH_2COOCH_3$ | $-CH_2CH_2OCH_2CH_2COOCH_3$ | $C^*\genfrac{}{}{0pt}{}{CN}{COOCH_2CH_2OCH_2CH_2COOCH_3}$ |
| 14 | $CNCH_2COOC_6H_5$ | $C_6H_5-$ | $C^*\genfrac{}{}{0pt}{}{CN}{COOC_6H_5}$ |
| 15 | $CNCH_2COOC_6H_4Cl$ | $-C_6H_4Cl$ | $C^*\genfrac{}{}{0pt}{}{CN}{COOC_6H_4Cl}$ |
| 16 | $CNCH_2COOC_6H_4OCH_3$ | $-C_6H_4OCH_3$ | $C^*\genfrac{}{}{0pt}{}{CN}{COOC_6H_4OCH_3}$ |
| 17 | $CNCH_2COOC_6H_3Cl_2(o)$ | $-C_6H_3(o)(Cl)(Cl)$ | $C^*\genfrac{}{}{0pt}{}{CN}{COOC_6H_3(o)(Cl)(Cl)}$ |
| 18 | $CNCH_2COOC_6H_4NHCOCH_3$ | $-C_6H_4NHCOCH_3$ | $C^*\genfrac{}{}{0pt}{}{CN}{COOC_6H_4NHCOCH_3}$ |
| 19 | $CNCH_2COO$-(naphthyl) | (naphthyl) | $C^*\genfrac{}{}{0pt}{}{CN}{COO\text{-(naphthyl)}}$ |
| 20 | $CNCH_2COO$-(naphthyl-$NHCOCH_3$) | (naphthyl-$NHCOCH_3$) | $C^*\genfrac{}{}{0pt}{}{CN}{COO\text{-(naphthyl-}NHCOCH_3\text{)}}$ |

$C^*$—indicates the moiety: $HO-\text{C}_6\text{H}_4-CH=$

The cyanoacetates which contain phenyl moieties such as described above in Examples 14 through 20 are preferably condensed with the p-hydroxybenzaldehyde in the presence of pyridine as a solvent in lieu of ethanol, the latter as described in Example 1. The following examples will illustrate such condensations as well as others within the purview of this invention.

EXAMPLE 21

*Preparation of p-Sulfonamidophenylcyanoacetate*

This compound is prepared by combining 2 moles of cyanoacetic acid, 2.5 moles of p-sulfonamidophenol in 350 mls. of chloroform in the presence of 15 g. of a mixed alkane sulfonic acid catalyst. The mixture is heated under reflux until the evolution of water ceases. The product is isolated by extraction with chloroform, which extract is then dried and distilled to remove the chloroform solvent.

Condensation between the above product and p-hydroxy benzaldehyde is carried out by heating 1 mole equivalent of each of the reactants in the presence of 1.2 liters of pyridine as a solvent and 12 g. of morpholine as catalyst. The reactants are refluxed for 6 hours and thereafter evaporated to dryness.

EXAMPLE 22

The compound described in Example 21 is polyoxyalkylated with ethylene oxide in the following manner. To protect the phenolic hydroxyl group against polyoxyalkylation, the corresponding benzene sulfonate ester is first prepared in the following manner. To 1 mole of the compound of Example 21 dissolved in 4 moles of pyridine maintained at a temperature of about 5° C. there is slowly added 1.2 moles of benzene sulfonyl chloride over a period of 20 minutes. The mixture is then heated gently at 55° C. for 30 minutes, then allowed to cool to room temperature and drowned in ice water containing sufficient hydrochloric acid to neutralize the pyridine. The water soluble product is isolated and dried. Ethoxylation is then carried out by adding to 1 mole of the above product 1.2% by weight based on the weight of the said product of potassium hydroxide and thereafter 4 moles of ethylene oxide are added while maintaining the mixture in an autoclave at 75° C. The resultant product is then hydrolyzed in 2-N-hydrochloric acid by gentle refluxing for 30 minutes at 75° C. whereby benzenesulfonic acid is split off. The pH is adjusted to a pH of about 5 and sodium chloride is added to the aqueous mass at a temperature of 50° C. until a 30% solution of the salt is present (almost saturated). To the aqueous volume an equal volume of isopropanol is added and the mixture vigorously agitated. The ethoxylated product is preferentially soluble in the isopropanol to the exclusion of benzene sulfonic acid which remains in the salt-water layer (immiscible with isopropanol when so nearly saturated with sodium chloride). The isopropanol is then distilled leaving substantially pure ethoxylated product containing 4 oxyethyl groups per mole of cyanocinnamate.

EXAMPLE 23

Preparation of

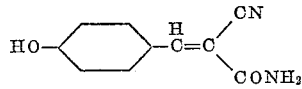

This compound is prepared by the condensation of p-hydroxybenzaldehyde with cyanoacetamide in the manner described in Example 1, substituting the cyanoacetamide for cyanoethyl cyanoacetate of that example.

EXAMPLE 24

The isolated product of Example 23 is polyoxyalkylated with ethylene oxide in the manner described in Example 22 employing 9 moles of ethylene oxide per mole of cyano-cinnamate. The phenolic hydroxyl group is protected in the same manner. The oxyethylated product is then hydrolyzed employing 2% sodium hydroxide solution (based on the ester to be hydrolyzed). The aqueous alkaline mass is refluxed for 45 minutes at 80° C. and then cooled to 30° C. The pH is adjusted to 5 with dilute hydrochloric acid and then sufficient sodium chloride is added as described in Example 22 to give a 30% salt solution. An equal volume of pyridine is added and the ethoxylated product is preferentially extracted thereby, leaving the benzene sulfonic acid in the aqueous salt layer. The pyridine is distilled leaving substantially pure polyoxyethylated product.

EXAMPLE 25

The hydroxy ethyl ester of Example 6 is polyoxyalkylated with ethylene oxide employing 15 moles of ethylene oxide per mole of cyanocinnamate employing the procedure described in Example 22. The phenolic hydroxyl group is protected in the same manner by conversion to the benzenesulfonate ester. Hydrolysis and isolation of the free phenol containing 15 moles of ethylene oxide condensed on the aliphatic alcohol grouping is isolated in the manner described in Example 24. It is to be noted that the higher oxyalkylated products are more readily isolated employing pyridine or α-picoline as preferential solvent, whereas isopropanol is preferred where low quantities of ethylene oxide are condensed with the active hydrogen compound.

EXAMPLE 26

The procedure of Example 25 is once again repeated except that 35 moles of ethylene oxide are condensed with the cyanocinnamate.

EXAMPLE 27

The procedure of Example 25 is once again repeated employing 35 moles of propylene oxide to yield a product containing 35 oxypropyl groups.

The compounds in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

Other variations in and modifications of the described processes which will be obvious to those skilled in the art can be made in this invention without departing from the scope or spirit thereof.

We claim:
1. A compound as defined in claim 9 wherein $R_1$ is cyanoalkyl.
2. A compound as defined in claim 1 wherein $R_1$ is cyanoethyl.
3. A compound as defined in claim 9 wherein $R_1$ is hydroxyalkyl.
4. A compound as defined in claim 3 wherein $R_1$ is $-C_2H_4(OC_2H_4)_{15}OH$.
5. A compound as defined in claim 3 wherein $R_1$ is

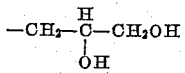

6. A compound as defined in claim 3 wherein $R_1$ is hydroxyethyl.
7. A compound as defined in claim 9 wherein $R_1$ is tetrahydrofurfuryl.
8. A compound as defined in claim 9 wherein $R_1$ is phenyl.
9. A compound of the formula

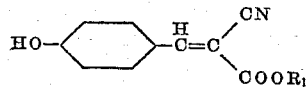

wherein $R_1$ is a radical selected from the group consisting of hydroxyalkyl, haloalkyl, cyanoalkyl, alkoxyalkyl, hydroxyalkoxyalkyl, carbalkoxyalkyl, phenyl, alkyl phenyl, alkoxy phenyl, halo phenyl and tetrahydrofurfuryl.

References Cited in the file of this patent

UNITED STATES PATENTS

| | | |
|---|---|---|
| 2,436,007 | Kendall | Feb. 17, 1948 |
| 2,649,471 | Williams et al. | Aug. 18, 1953 |
| 2,806,872 | Kartinos et al. | Sept. 17, 1957 |
| 2,914,551 | Kartinos et al. | Nov. 24, 1959 |

OTHER REFERENCES

Subject Index II, Chemical Abstracts, vol. 46 (1952), col. 12,414.

Fieser: Organic Chemistry (3rd ed., 1956), pp. 30–31.

Plaisted: Contributions, Boyce Thompson Institute, vol. 18 (October 1954–June 1957), page 232.

Plaisted: Contributions, Boyce Thompson Institute, vol. 18 (October 1954–June 1957), pages 233 to 240.

Subject Index II, Chemical Abstracts, vol. 46 (1952), col. 12,414.

UNITED STATES PATENT OFFICE
CERTIFICATE OF CORRECTION

Patent No. 3,074,971　　　　　　　　　　　　　January 22, 1963

Albert F. Strobel et al.

It is hereby certified that error appears in the above numbered patent requiring correction and that the said Letters Patent should read as corrected below.

Column 1, line 67, for "fim" read -- film --; column 2, lines 50 to 55, the formula should appear as shown below instead of as in the patent:

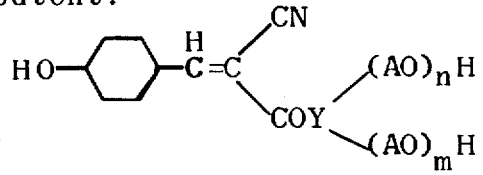

Signed and sealed this 19th day of November 1963.

(SEAL)
Attest:

ERNEST W. SWIDER

Attesting Officer

EDWIN L. REYNOLDS

Acting Commissioner of Patents